US012103323B2

(12) United States Patent
Kondo et al.

(10) Patent No.: US 12,103,323 B2
(45) Date of Patent: Oct. 1, 2024

(54) TAPE CASSETTE

(71) Applicant: BROTHER KOGYO KABUSHIKI KAISHA, Nagoya (JP)

(72) Inventors: Tomohiro Kondo, Nagoya (JP); Mariko Niizeki, Ichinomiya (JP); Shunsuke Mizutani, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 121 days.

(21) Appl. No.: 18/059,411

(22) Filed: Nov. 28, 2022

(65) Prior Publication Data

US 2023/0166548 A1 Jun. 1, 2023

(30) Foreign Application Priority Data

Nov. 30, 2021 (JP) ................................ 2021-194545

(51) Int. Cl.
*B41J 32/00* (2006.01)

(52) U.S. Cl.
CPC .................................... *B41J 32/00* (2013.01)

(58) Field of Classification Search
CPC ..... B41J 2/315; B41J 2/32; B41J 2/325; B41J 15/044; B41J 11/009; B41J 32/00; B41J 3/4075; B41F 16/00; B41F 16/0006
See application file for complete search history.

(56) References Cited

U.S. PATENT DOCUMENTS

2010/0247207 A1* 9/2010 Sago ...................... B41J 15/044 400/207
2010/0329767 A1 12/2010 Sago et al.
2020/0406655 A1* 12/2020 Iijima ...................... B41J 32/00

FOREIGN PATENT DOCUMENTS

JP 2011-11399 A 1/2011
JP 2015085605 * 5/2015 ............ B41J 15/042

* cited by examiner

*Primary Examiner* — Kristal Feggins
(74) *Attorney, Agent, or Firm* — KENEALY VAIDYA LLP

(57) ABSTRACT

A tape cassette includes a cassette case, a tape roll, a print tape wound around the tape roll, a ribbon roll, an ink ribbon wound around the ribbon roll, a recess, an arm portion, and a guide. The print tape and the ink ribbon are conveyed inside the cassette case and the arm portion. The arm portion includes a discharge port to discharge the print tape and the ink ribbon. The guide is provided at a position downstream of the discharge port, on a conveyance path of the print tape and the ink ribbon. A first end of the guide includes a roller members configured to rotate around a shaft extending in the up-down direction. The guide is configured to guide the ink ribbon, by the first end coming into contact with the ink ribbon, to a winding path branching from the conveyance path and toward the ribbon winding spool.

3 Claims, 10 Drawing Sheets

TAPE CASSETTE

REFERENCE TO RELATED APPLICATIONS

This application claims priority to Japanese Patent Application No. 2021-194545, filed on Nov. 30, 2021, the content of which is hereby incorporated by reference.

BACKGROUND ART

The present disclosure relates to a tape cassette housing a print material.

In known art, a tape cassette is known that clamps a film tape and an ink ribbon between a platen roller and a thermal head, and prints characters and the like on the film tape, by heat transfer printing. The film tape is conveyed toward a tape discharge port as a result of a tape feed roller and a movable conveyance roller working in concert. Between the platen roller and the movable conveyance roller, a guide wall is provided that guides the ink ribbon to a ribbon winding spool. The guide wall separates the ink ribbon from the film tape as a result of an end of the guide wall pressing against the ink ribbon.

DESCRIPTION

As a result of the ribbon winding spool being driven to rotate and pulling and winding the ink ribbon, the ink ribbon comes into contact with the end of the guide wall and is pulled away from the film tape. However, if a frictional force generated by the film tape pressing the ink ribbon against the end of the guide wall is greater than a force with which the ribbon winding spool pulls the ink ribbon, there is a possibility that the film tape may be conveyed without the ink ribbon being sufficiently separated from the film tape, and a jam may occur in the region of the end of the guide wall. If the force with which the ribbon winding spool pulls the ink ribbon is increased, the ink ribbon is removed from the film tape before the characters and the like transferred from the ink ribbon are fixed on the film tape, and there is a possibility that it is not possible to secure a peeling distance required for the fixing of the transferred characters and the like.

The object of the present disclosure is to provide a tape cassette in which the ink ribbon can be more reliably peeled while securing a peeling distance.

A tape cassette according to the present disclosure includes a cassette case, a tape roll, a print tape, a ribbon roll, an ink ribbon, a ribbon winding spool, an arm portion, and a guide. The cassette case includes a bottom wall and a side wall. The side wall intersects the bottom wall at a first side in a first direction. The cassette case has a recess that is recessed from a part of the side wall to a second side in the first direction. The second side in the first direction is opposite to the first side in the first direction. The part of the side wall includes an opening. The recess passes through the cassette case in an up-down direction. The tape roll is housed inside the cassette case. The print tape is wound around the tape roll. The ribbon roll is housed inside the cassette case. The ink ribbon is wound around the ribbon roll. The ribbon winding spool is housed inside the cassette case. The arm portion includes a first wall and a second wall. The first wall is a part of the side wall. The second wall faces the first wall and extends upward from the bottom wall. The arm portion extends from a first side in a second direction to a second side in the second direction. The second direction is a direction intersecting the first direction and the up-down direction. The first side in the second direction is opposite to the second side in the second direction. The arm portion includes a discharge port at an end. The end is positioned on the second side in the second direction with respect to the opening. The discharge port is configured to discharge the print tape and the ink ribbon conveyed between the first wall and the second wall. The recess is defined by the second wall and a peripheral wall at least. The guide is provided at a position downstream of the discharge port of the arm portion, on a conveyance path of the print tape and the ink ribbon. The guide includes a first end at an end of the first side in the first direction. The guide is configured to guide the ink ribbon to a winding path by the first end coming into contact with the ink ribbon. The winding path is a path branching from the conveyance path and toward the ribbon winding spool. The first end of the guide is configured to rotate around a shaft extending in the up-down direction. The first end includes a roller member in the up-down direction.

The ink ribbon is conveyed along the conveyance path together with the print tape, is peeled from the print tape by the guide, and is conveyed along the winding path. In order to secure a peeling distance necessary for fixing the characters and the like transferred from the ink ribbon, the print tape reaches the guide in a state of being closely adhered to the ink ribbon. The guide includes the roller member at the first end thereof. By the rotation of the roller member, the guide can alleviate a frictional force between the ink ribbon and the first end caused by the print tape pressing the ink ribbon against the first end. Thus, the tape cassette can more reliably perform the peeling of the ink ribbon while securing the peeling distance.

Hereinafter, an embodiment embodying the present disclosure will be described with reference to the drawings. The referenced drawings are used to illustrate technological features that can be adopted by the present disclosure, and configurations, control, and the like of devices described herein are not intended to limit the present disclosure to those configurations, control, and the like, and are simply explanatory examples.

Figure 1:
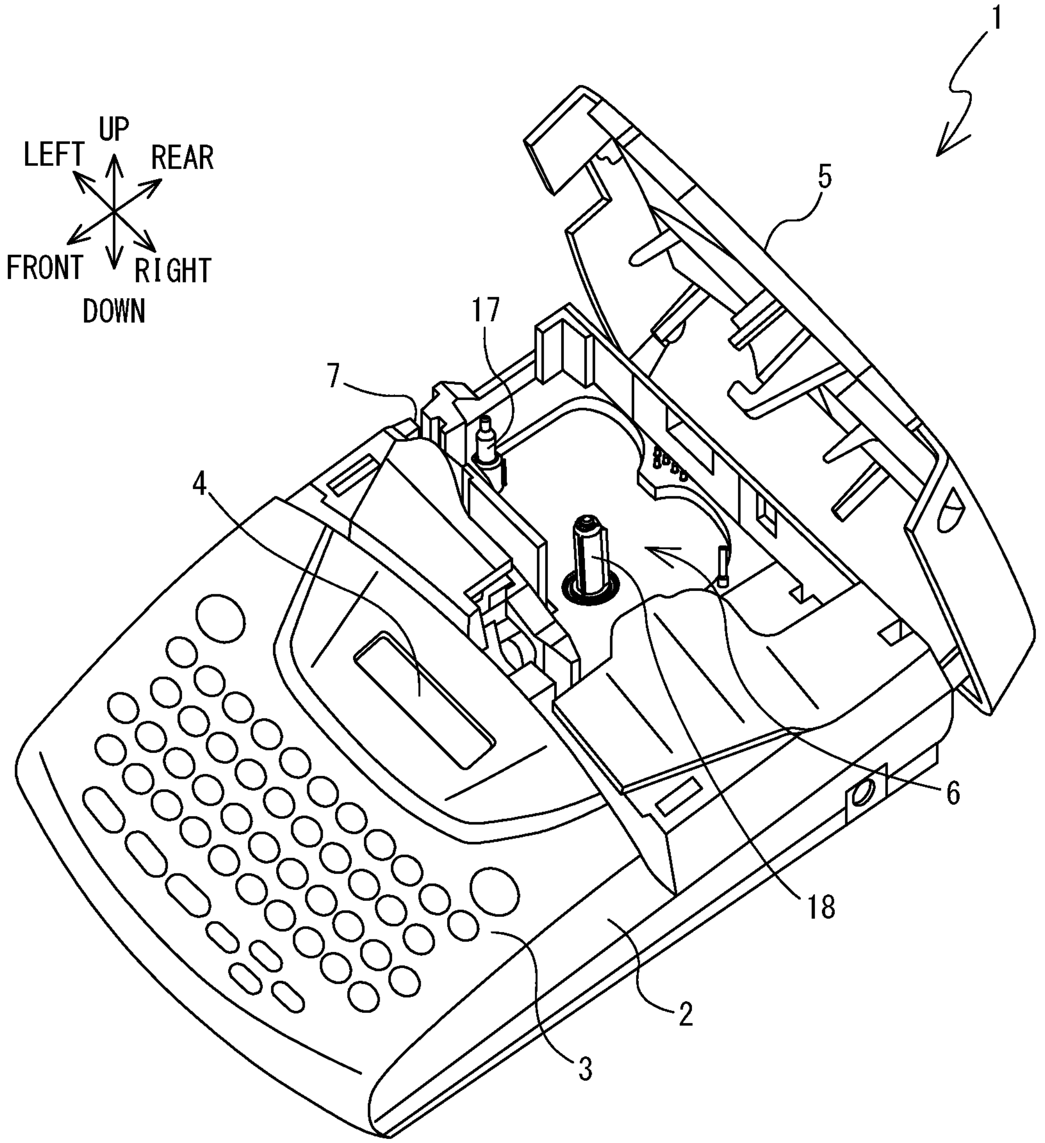
FIG. 1 is a perspective view of a tape printer with a cassette cover open.

Hereinafter, the lower left direction, the upper right direction, the lower right direction, the upper left direction, the upper direction, and the lower direction in FIG. 1 are, respectively, the front direction, the rear direction, the right direction, the left direction, the upper direction, and the lower direction of a tape printer 1. The lower right direction, the upper left direction, the upper right direction, the lower left direction, the upper direction, and the lower direction in FIG. 2 are, respectively, the front direction, the rear direction, the right direction, the left direction, the upper direction, and the lower direction of a tape cassette 30.

The tape cassette 30 of the present embodiment can be mounted in the tape printer 1. The tape printer 1 is a general-purpose printer that can use various tape cassettes, such as a thermal type, a laminate type, a receptor type, and the like. The thermal type tape cassette is provided with a heat-sensitive paper tape. The laminate type tape cassette is provided with a double-sided adhesive tape, a film tape, and an ink ribbon. The tape cassette 30 is the receptor type tape cassette, and is provided with a print tape 8 and an ink ribbon 9. The tape printer 1 performs printing by transferring ink of the ink ribbon 9 to the print tape 8, by applying heat.

As shown in FIG. 1, the tape printer 1 is provided with a cuboid-shaped main body cover 2. An input portion 3 is provided at a front portion of the upper surface of the main body cover 2. The tape printer 1 receives operations via the input portion 3, such as the input of various information, switching on and off of a power source, and the like. A display 4 is provided to the rear of the input portion 3. The display 4 can display the various input information, and the like. A cassette cover 5 is attached to the main body cover 2, further to the rear than the display 4. The cassette cover 5 covers a mount portion 6 from above in an openable/closable manner, the tape cassette 30 being detachably mounted to the mount portion 6. A user opens and closes the cassette cover 5 when replacing the tape cassette 30. A discharge port 7 is provided at the left of the main body cover 2. The printed print tape 8 is discharged from the tape printer 1 via the discharge port 7.

Figure 2:
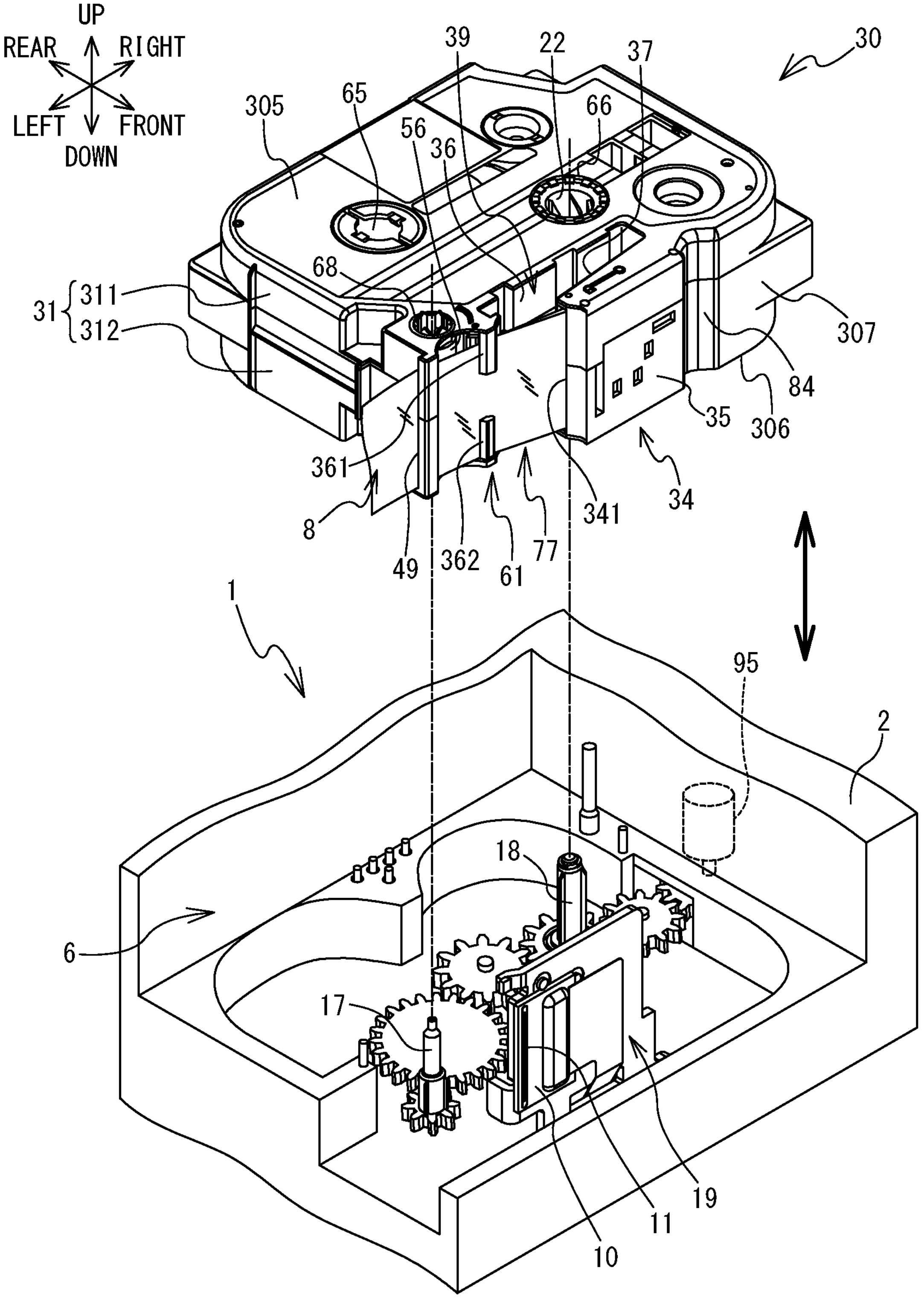
FIG. 2 is a perspective view of a tape cassette and a mount portion.
Figure 3:
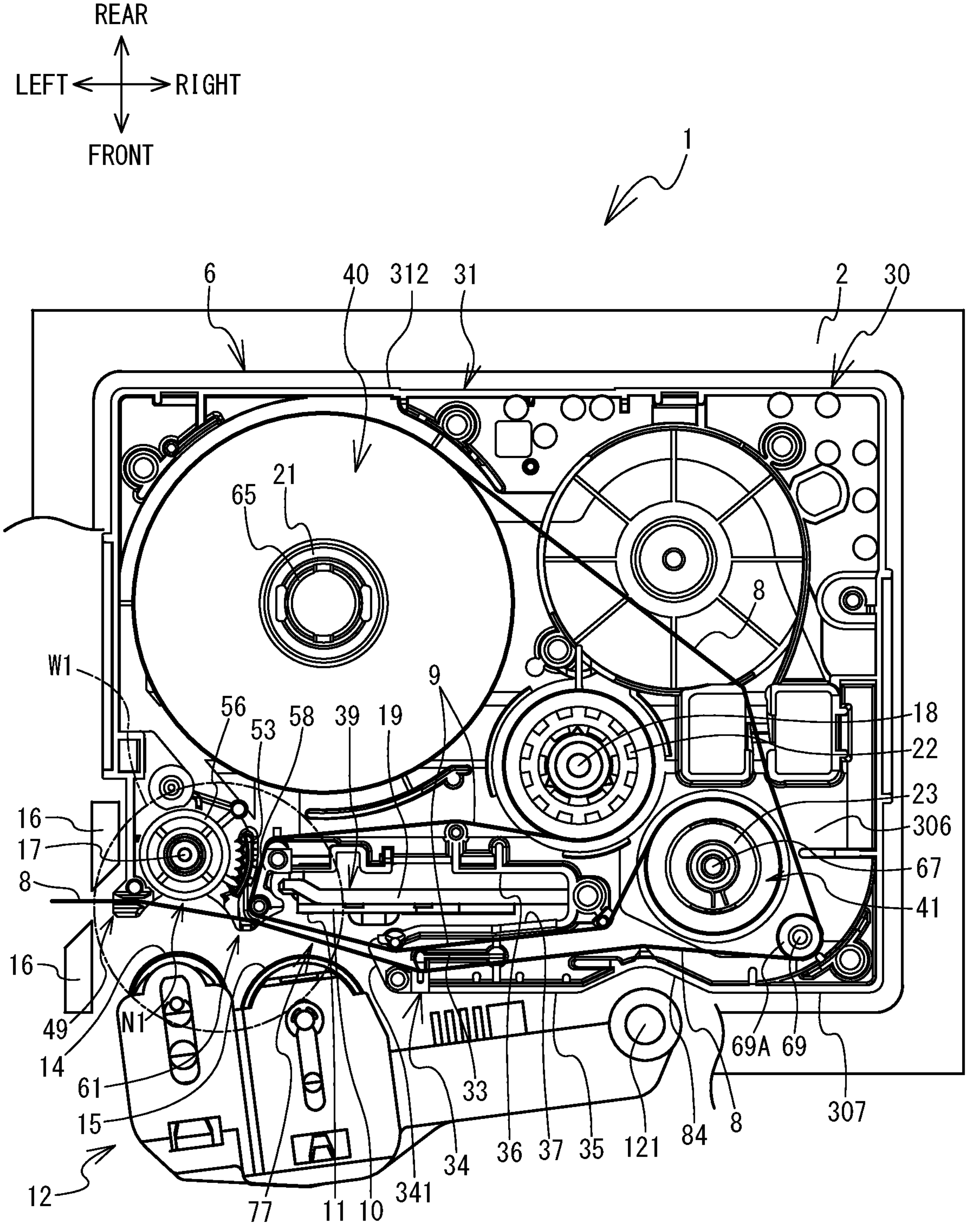
FIG. 3 is a plan view of the mount portion when the tape cassette is mounted and a platen holder is at a stand-by position.

As shown in FIG. 2 and FIG. 3, the mount portion 6 has a shape corresponding to the tape cassette 30, and is recessed downward from the upper surface of the main body cover 2. The tape cassette 30 is detachably mounted to the mount portion 6. A head holder 19 is provided at a front portion of the mount portion 6. The head holder 19 is plate-shaped, and extends in the up-down direction and the left-right direction. When the tape cassette 30 is mounted to the mount portion 6, the head holder 19 is inserted into a head insertion portion 39 of the tape cassette 30. A thermal head 10 is provided at the front surface of the head holder 19. The thermal head 10 is provided with a plurality of heating elements 11. The plurality of heating elements 11 are aligned in a single row in the up-down direction. In a state in which the tape cassette 30 is mounted to the mount portion 6, the thermal head 10 heats, using the plurality of heating elements 11, the ink ribbon 9 exposed from an arm opening 341 to be described later.

A conveyance motor 95 is installed outside the mount portion 6 (to the upper right of the mount portion 6 in FIG. 2). The conveyance motor 95 is a stepping motor. The conveyance motor 95 rotationally drives a tape drive shaft 17 and a ribbon winding shaft 18, via a plurality of coupling gears. The tape drive shaft 17 is rotatably installed standing upward at a position at a front left portion of the mount portion 6. The tape drive shaft 17 is a shaft body that can be detachably mounted to a feed roller 56 to be described later. The print tape 8 is conveyed as a result of the tape drive shaft 17 rotating. The ribbon winding shaft 18 is rotatably installed standing upward at a position at substantially the center of the mount portion 6. The ribbon winding shaft 18 is a shaft body that can be detachably mounted to a ribbon winding spool 22 to be described later.

As shown in FIG. 3, a cutting mechanism 16 is provided to the left of the tape drive shaft 17. The cutting mechanism 16 cuts the print tape 8 as a result of being driven by a cutting motor (not shown in the drawings). A platen holder 12 is provided to the front of the head holder 19. The platen holder 12 is arm-shaped, and is supported by a support shaft 121 so as to be able to pivot around a vertical axis. The support shaft 121 is provided at the right end of the platen holder 12.

A platen roller 15 and a conveyance roller 14 are both rotatably supported at the leading end of the platen holder 12. The platen roller 15 can approach or separate from the thermal head 10 in accordance with the pivoting of the platen holder 12. The conveyance roller 14 is provided to the left of the platen roller 15, and can approach or separate from the feed roller 56 in accordance with the pivoting of the platen holder 12.

Figure 6:
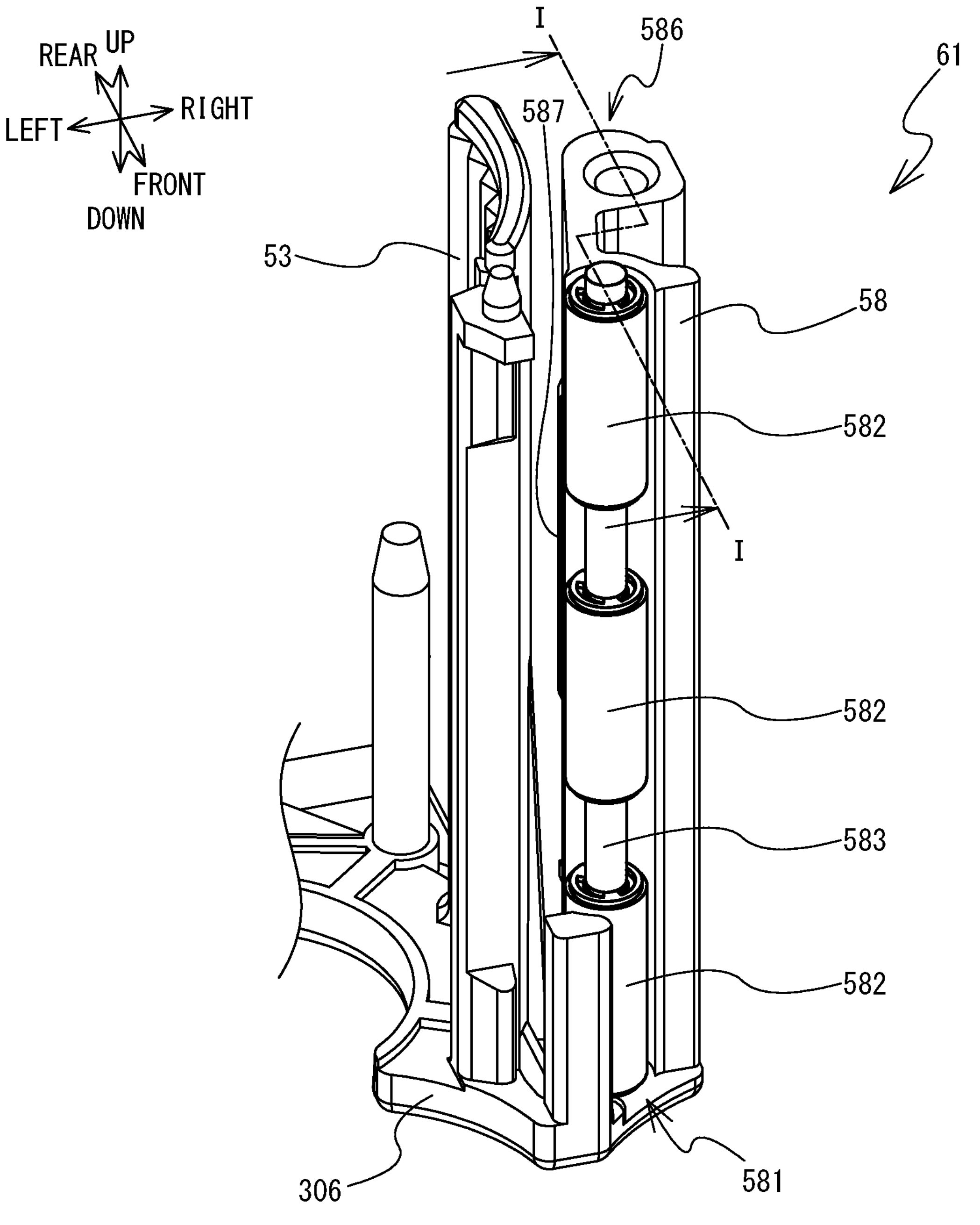
FIG. 6 is an enlarged perspective view of a regulating guide.
Figure 7:
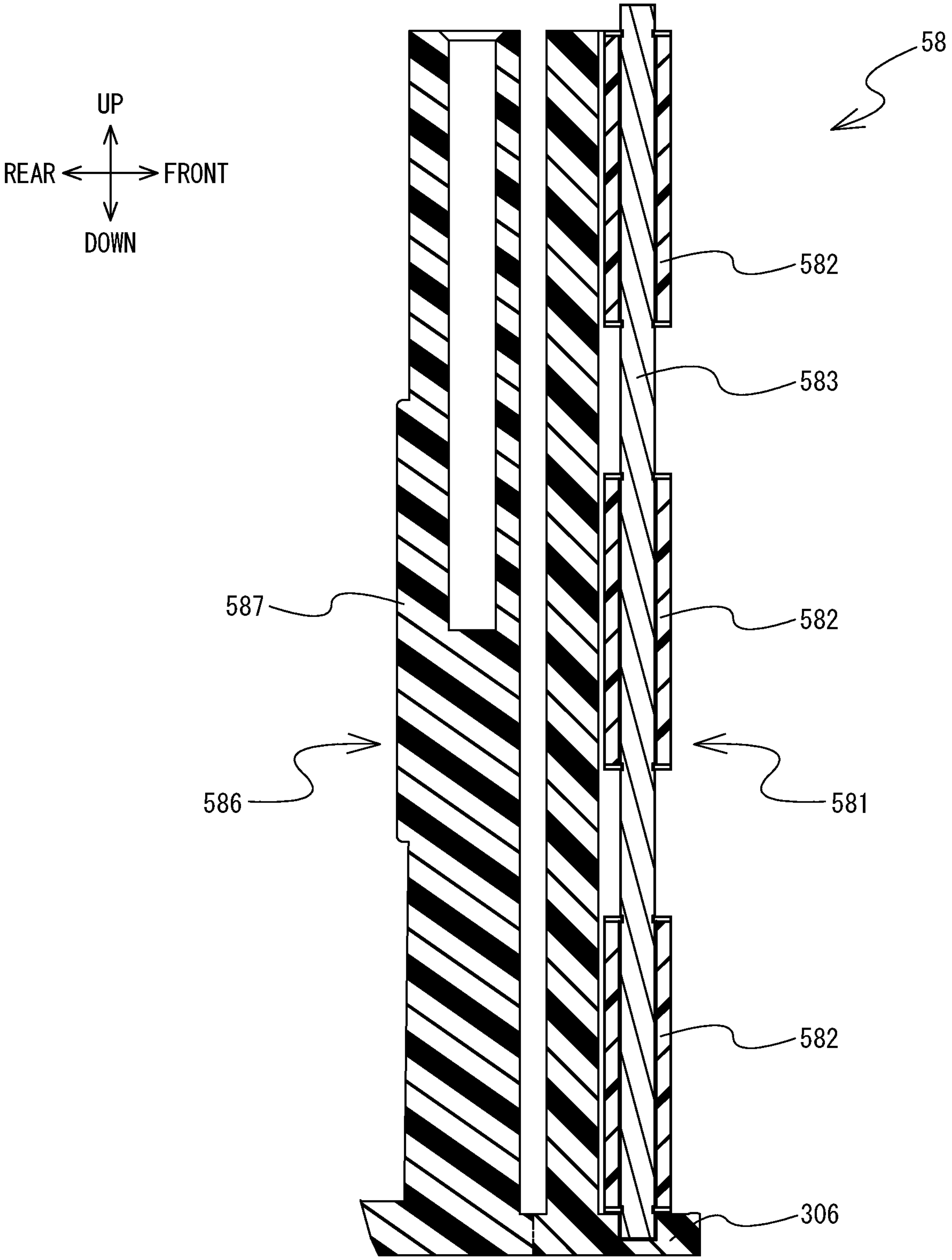
FIG. 7 is a cross-sectional view of a guide wall as seen in the direction of arrows along a single dot chain line I-I shown in FIG. 6.

In the present embodiment, when the cassette cover 5 is opened, the platen holder 12 is configured to move toward a stand-by position (a position shown in FIG. 3), and when the cassette cover 5 is closed, the platen holder 12 is configured to move toward a print position (a position shown in FIG. 6). In the stand-by position, the platen holder 12 moves in a direction separating from the mount portion 6. Thus, the user can attach or remove the tape cassette 30 to and from the mount portion 6. In the print position, the platen holder 12 moves in a direction approaching the mount portion 6. Thus, when the tape cassette 30 is mounted to the mount portion 6, the platen roller 15 presses the print tape 8 and the ink ribbon 9 against the thermal head 10, and the conveyance roller 14 presses the print tape 8 against the feed roller 56.

The platen roller 15 is driven to rotate in concert with the tape drive shaft 17, by the conveyance motor 95. In order to suppress warping of the print tape 8 by the conveyance, the platen roller 15 is coupled to the conveyance motor 95 via a plurality of gears (not shown in the drawings), so that a rotation speed of the platen roller 15 is slower than a rotation speed of the tape drive shaft 17 (the feed roller 56).

Figure 4:
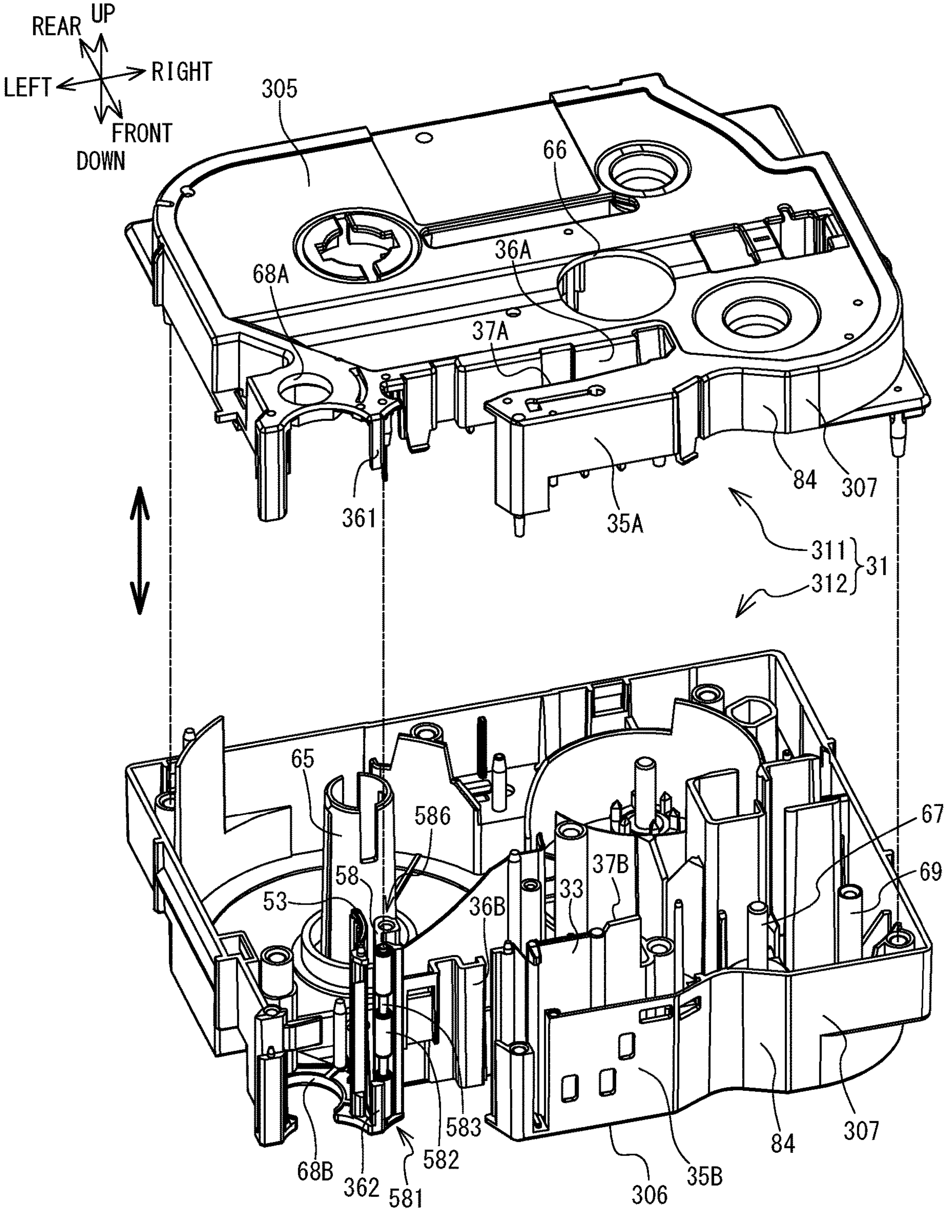
FIG. 4 is a perspective view of an upper case and a lower case of a cassette case.

As shown in FIG. 2 to FIG. 4, the tape cassette 30 includes a cassette case 31. The cassette case 31 is substantially cuboid, and is configured by combining an upper case 311 and a lower case 312. The upper case 311 includes an upper wall 305 forming the upper surface of the cassette case 31, and is a box shape that is open downward. The lower case 312 includes a bottom wall 306 forming the bottom surface of the cassette case 31, and is a box shape that is open upward. The upper case 311 is fixed to an upper portion of the lower case 312.

A support cylinder 65, which rotatably supports a tape spool 21 mounted inside the cassette case 31, is provided at a rear left portion of the cassette case 31. The support cylinder 65 protrudes in a cylindrical shape upward from the bottom wall 306 of the lower case 312. The print tape 8 is wound around the tape spool 21. A supply source of the print tape 8 configured by the print tape 8 being wound around the tape spool 21 is referred to as a tape roll 40.

A ribbon boss 67, which rotatably supports a ribbon spool 23 mounted inside the cassette case 31, is provided at a front right portion of the cassette case 31. The ribbon boss 67 protrudes upward from the bottom wall 306 of the lower case 312. The ink ribbon 9 is wound around the ribbon spool 23. A supply source of the ink ribbon 9 configured by the ink ribbon 9 being wound around the ribbon spool 23 is referred to as a ribbon roll 41.

A support hole 66, which rotatably supports the ribbon winding spool 22 mounted inside the cassette case 31, is provided substantially at a center portion of the cassette case 31, between the ribbon boss 67 and the support cylinder 65. The support hole 66 is a through hole passing through the cassette case 31 in the up-down direction. The ribbon winding shaft 18 is inserted into the ribbon winding spool 22. The ribbon winding spool 22 rotates in accordance with the rotational driving of the ribbon winding shaft 18, and pulls out and winds the ink ribbon 9 from the ribbon roll 41.

A support hole 68, which rotatably supports the feed roller 56 is provided at a front left corner portion of the cassette case 31. The support hole 68 includes an opening 68A provided in the upper wall 305, and an opening 68B provided in the bottom wall 306. The openings 68A and 68B are through holes provided at positions corresponding to each other in the up-down direction of the cassette case 31. The feed roller 56 is cylindrically shaped, and extends in the up-down direction. The support hole 68 supports the upper end portion and the lower end portion of the feed roller 56. A portion of the front end of the outer peripheral surface of the feed roller 56 is exposed to the front from the cassette case 31. In a state in which the tape cassette 30 is mounted to the mount portion 6, the tape drive shaft 17 is inserted into the inside of the feed roller 56. The feed roller 56 rotates in accordance with the rotational driving of the tape drive shaft 17, and discharges the print tape 8 from the cassette case 31 in concert with the conveyance roller 14.

A roller shaft 69, which rotatably supports a pathway roller 69A that is a circular cylindrically-shaped rotational body, is provided at a front right corner portion of the cassette case 31. The roller shaft 69 protrudes upward from the bottom wall 306 of the lower case 312. Inside the cassette case 31, a path along which the print tape 8 is pulled out from the tape roll 40 and is discharged to the outside of the cassette case 31 via a discharge guide 49 to be described later will be referred to as a conveyance path. The pathway roller 69A defines the conveyance path of the print tape 8, and comes into contact with the print tape 8 from the left.

A semicircular recess 84, which is recessed to the rear in a substantially semicircular shape in a plan view, is provided in a front wall 307 of the cassette case 31. The semicircular recess 84 is formed across the cassette case 31 in the up-down direction. When the tape cassette 30 is mounted to the mount portion 6, the semicircular recess 84 is an escape portion that avoids interference between the tape cassette 30 and the support shaft 121 of the platen holder 12.

An arm portion 34 is provided at the front surface of the cassette case 31. The arm portion 34 extends to the left and to the front from the right front portion of the cassette case 31. Of the front wall 307 of the cassette case 31, a portion extending to the left from the semicircular recess 84 is an arm front wall 35. The arm front wall 35 is configured by combining an upper arm front wall 35A provided at the upper case 311 and a lower arm front wall 35B provided at the lower case 312.

An arm rear wall 37 that is the rear wall of the arm portion 34 is configured by combining an upper arm rear wall 37A provided at the upper case 311, and a lower arm rear wall 37B provided at the lower case 312. An arm opening 341 is provided between the left end portion of the arm front wall 35 and the left end portion of the arm rear wall 37. The arm opening 341 is formed in a slit shape that extends in the up-down direction.

A regulating wall 33, which is a wall portion extending upward from the bottom wall 306, is provided between the lower arm front wall 35B and the lower arm rear wall 37B of the lower case 312. Inside the cassette case 31, a path along which the ink ribbon 9 passes from being pulled out from the ribbon roll 41 until being wound by the ribbon winding spool 22 will be referred to as a winding path. The conveyance path of the print tape 8 and the winding path of the ink ribbon 9 both pass through the inside of the arm portion 34, and extend toward the arm opening 341. Inside the arm portion 34, the conveyance path of the print tape 8 is defined between the regulating wall 33 and the arm front wall 35, and the winding path of the ink ribbon 9 is defined between the restricting wall 33 and the arm rear wall 37.

A peripheral wall that extends to the rear from the right end portion of the arm rear wall 37 and also extends in parallel to the arm rear wall 37 is a head peripheral wall 36. The head peripheral wall 36 is configured by combining an upper head peripheral wall 36A provided at the upper case 311 and a lower head peripheral wall 36B provided at the lower case 312.

The head insertion portion 39 is a space having a substantially rectangular shape in a plan view that is defined by the arm rear wall 37 and the head peripheral wall 36. The head insertion portion 39 is a recessed shape that is recessed to the rear with respect to the arm rear wall 37. The head insertion portion 39 forms an open section that passes through the tape cassette 30 in the up-down direction. The front wall 307 of the cassette case 31 includes an opening 77 to the left of the arm opening 341 of the arm portion 34. The head insertion portion 39 is also connected to the outside at the front surface side of the tape cassette 30, via the opening 77. The head holder 19 is inserted into the head insertion portion 39 in the state in which the tape cassette 30 is mounted to the mount portion 6.

Figure 5:
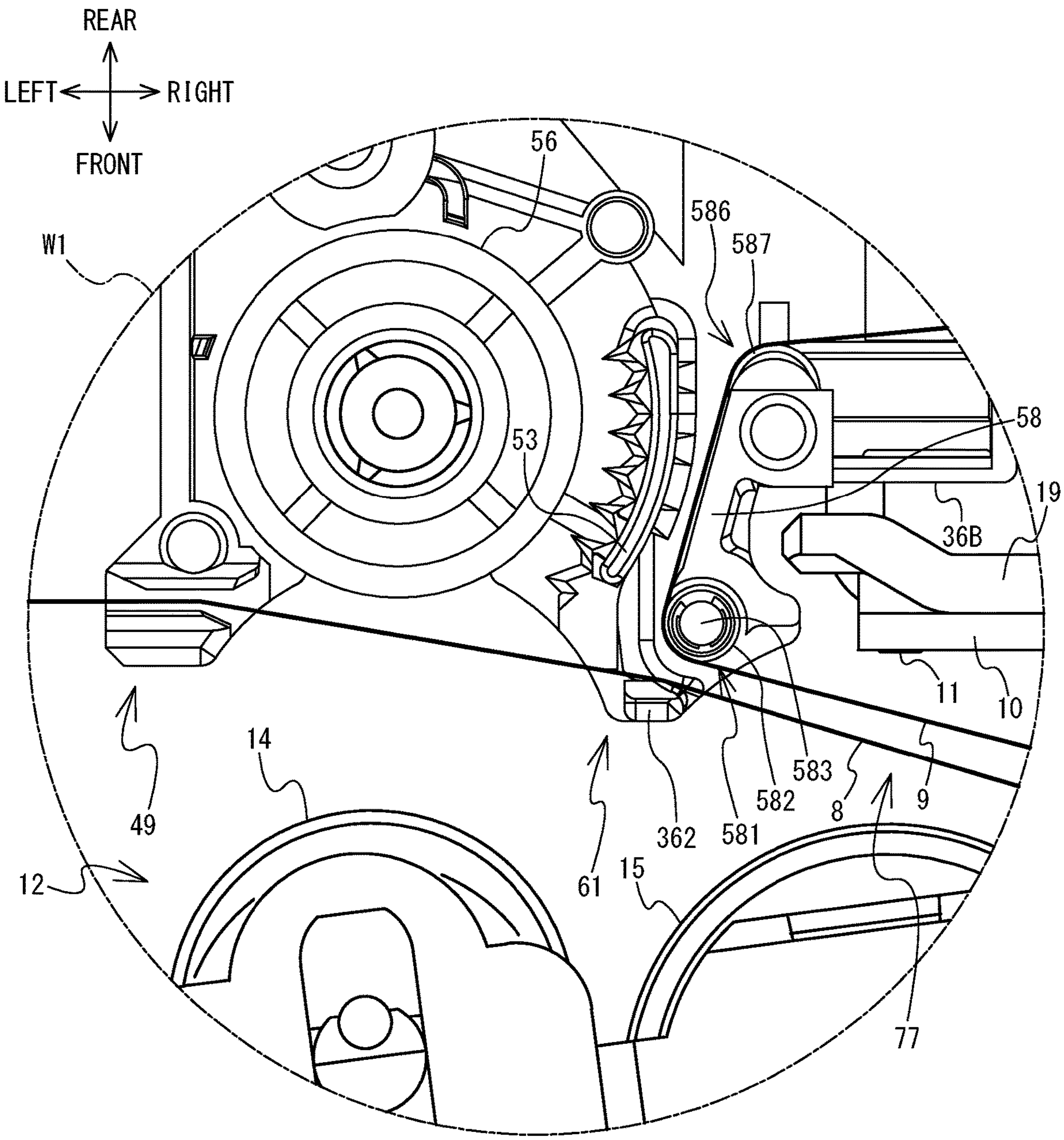
FIG. 5 is an enlarged view of a circle shown by a single dot chain line in FIG. 3.

A regulating guide 61 is provided to the left of the head insertion portion 39. The regulating guide 61 is positioned between the arm opening 341 and the feed roller 56, in the left-right direction. As shown in FIG. 4 and FIG. 5, the regulating guide 61 includes regulating members 361 and 362, a guide wall 58, and an isolation wall 53. The regulating member 361 is a plate-shaped body that extends downward from the upper wall 305. The regulating member 362 is a plate-shaped body that extends upward from the bottom wall 306 toward the regulating member 361. The regulating members 361 and 362 face each other in the up-down direction, and are positioned to the front of the guide wall 58. The regulating members 361 and 362 are positioned on the conveyance path of the print tape 8, and guide the print tape 8 to the discharge guide 49 of the cassette case 31, while regulating the forward movement of the print tape 8 discharged from the arm opening 341 of the arm portion 34.

As shown in FIG. 4 to FIG. 7, of the lower head peripheral wall 36B, the guide wall 58 is a wall portion that extends in the front-rear direction to the left of the head insertion portion 39. The guide wall 58 is formed in a rib shape protruding upward from the bottom wall 306 of the lower case 312. Three roller members 582 are provided at a leading end 581 at the front end of the guide wall 58. The roller members 582 are provided such that each can rotate independently around a shaft body 583 extending in the up-down direction, and are disposed separated from each other in the up-down direction. The position of each of the roller members 582 is determined with respect to the shaft body 583 by an E retaining ring. The lower end of the shaft body 583 is held by the bottom wall 306 of the lower case 312, and the upper end thereof is held by the upper wall 305 of the upper case 311. The roller members 582 regulate the winding path of the ink ribbon 9 discharged from the arm opening 341 to be a path toward the rear along the guide wall 58. Further, at the time of printing, the roller members 582 peel the ink ribbon 9 from the print tape 8. A length of an arrangement range over which the three roller members 582 are aligned in the up-down direction is greater than a width of the ink ribbon 9. Thus, even if a conveyance position of the ink ribbon 9 at the time of peeling is displaced in the up-down direction, the roller members 582 can maintain the ink ribbon 9 within the arrangement range of the roller members 582.

The winding path is regulated by a rear end 586 at the rear end of the guide wall 58 to be a path extending from the rear toward the right. The rear end 586 has a cross-section, in the horizontal direction, that is a semi-circular shape, extends in the up-down direction, and protrudes to the rear in a plan view. A bulge portion 587, which bulges to the outside of the rear end 586, is provided at a central portion, in the up-down direction, of the rear end 586. The bulge portion 587 is positioned on the winding path. The arrangement range of the three roller members 582 aligned in the up-down direction is greater than a length in the up-down direction of the bulge portion 587. As a result of a central portion, in the width direction, of the ink ribbon 9 that passes the rear end 586 being pressed and spread further outward by the bulge portion 587, an appropriate tension is applied to the ink ribbon 9. The ink ribbon 9 that has passed the rear end 586 is wound onto the ribbon winding spool 22 via the winding path passing to the rear of the head peripheral wall 36.

The isolation wall 53 is installed standing to the left of the guide wall 58. The isolation wall 53 is provided between the guide wall 58 and the feed roller 56 in the left-right direction, and is formed in a rib shape protruding upward from the bottom wall 306 of the lower case 312. The isolation wall 53 has a shape, in a plan view, that draws a gentle arc in the front-rear direction of the cassette case 31, along a part of an outer peripheral surface of the feed roller 56. Teeth are formed in a serrated shape, in a plan view, on the left surface of the isolation wall 53.

The discharge guide 49 is provided at the front left corner portion of the cassette case 31. The discharge guide 49 is positioned to the front and left of the feed roller 56, and is formed in a slit shape extending in the up-down direction. When the printed print tape 8 that has been separated from the ink ribbon 9 is conveyed via the feed roller 56, the print tape 8 passes through the inside of the discharge guide 49. The discharge guide 49 guides the print tape 8 to the outside of the cassette case 31.

Figure 8:
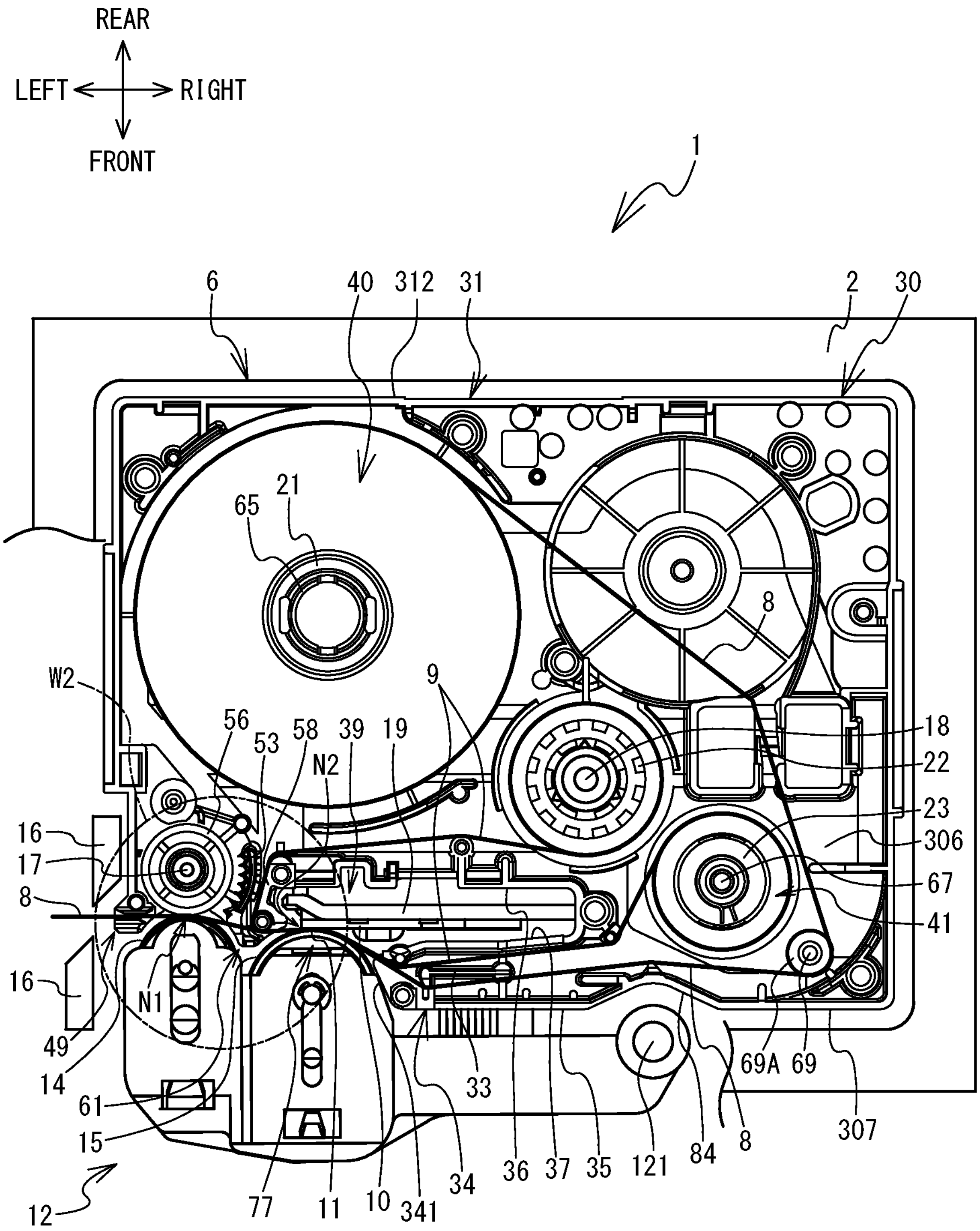
FIG. 8 is a plan view of the mount portion when the tape cassette is mounted and the platen holder is at a print position.
Figure 9:
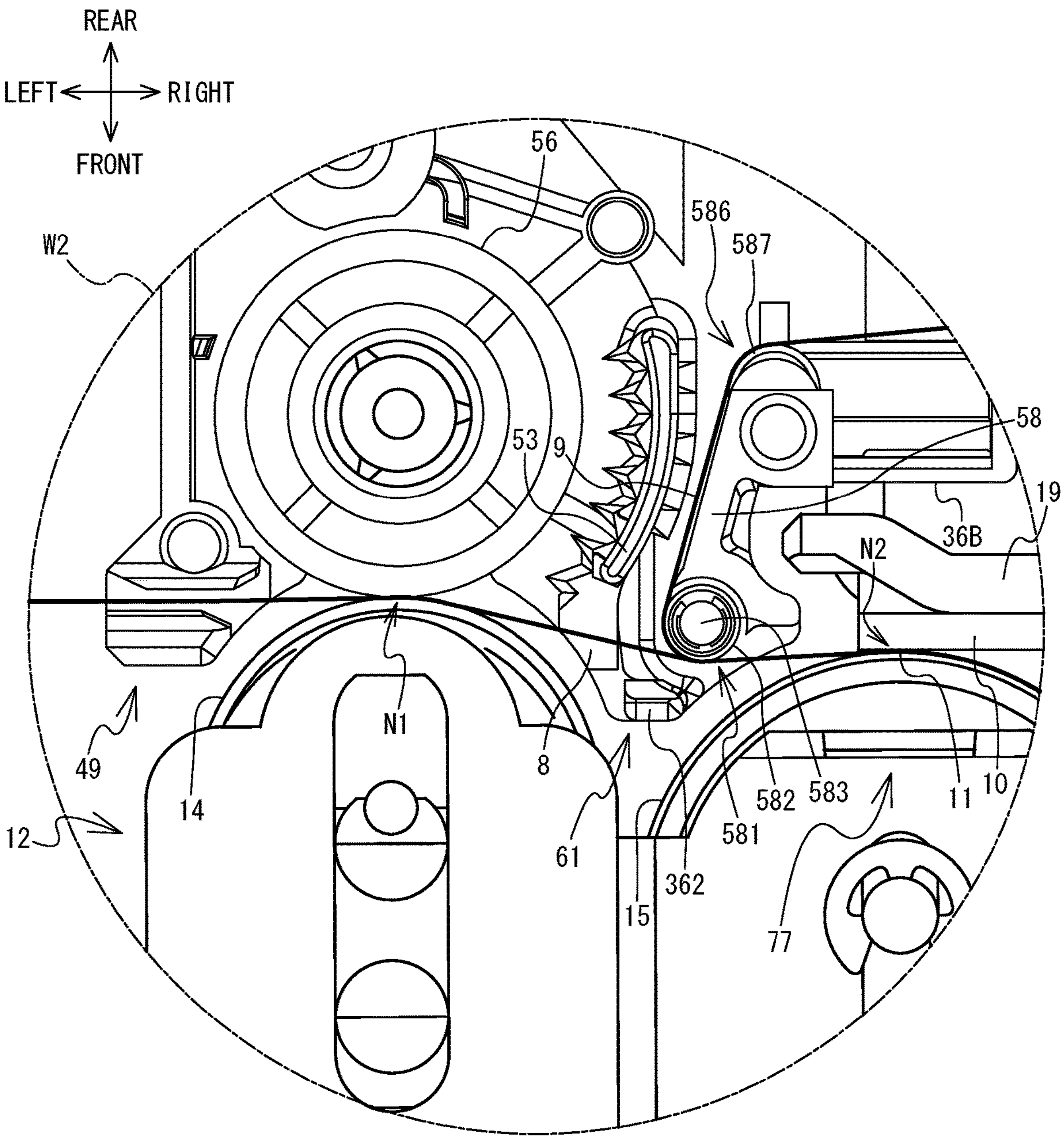
FIG. 9 is an enlarged view of a circle shown by a single dot chain line in FIG. 6.

Conveyance and print operations of the print tape 8 will be described. As shown in FIG. 8 and FIG. 9, when the tape cassette 30 is mounted to the mount portion 6 and the cassette cover 5 is closed, the platen holder 12 moves from the stand-by position to the print position. At the nip portion N1, the print tape 8 is clamped between the conveyance roller 14 and the feed roller 56, and is pressed. The platen roller 15 enters into the opening 77, presses the print tape 8 and the ink ribbon 9 to the rear of the thermal head 10, and the print tape 8 and the ink ribbon 9 are clamped between the platen roller 15 and the heating elements 11 at a nip portion N2, and are pressed. The feed roller 56 rotates in accordance with the driving of the tape drive shaft 17, and, in concert with the conveyance roller 14, pulls out the print tape 8 from the tape roll 40. The print tape 8 is conveyed to the arm portion 34 via the pathway roller 69A. On the other hand, the ribbon winding spool 22 rotates in accordance with the driving of the ribbon winding shaft 18, and pulls out the ink ribbon 9 from the ribbon roll 41. The ink ribbon 9 is conveyed toward the arm portion 34.

Inside the arm portion 34, the print tape 8 is guided along the conveyance path passing between the arm front wall 35 and the regulating wall 33, and is discharged to the opening 77 from the arm opening 341. The ink ribbon 9 is guided along the winding path passing between the arm rear wall 37 and the regulating wall 33, is overlaid with the print tape 8, and is discharged to the opening 77 from the arm opening 341.

In the opening 77, one surface of the print tape 8 discharged from the arm opening 341 is exposed to the front, and the other surface thereof faces the thermal head 10 with the ink ribbon 9 interposed therebetween. The heating elements 11 of the thermal head 10 perform the printing by transferring the ink of the ink ribbon 9 to the print tape 8, at the nip portion N2 between the heating elements 11 and the platen roller 15.

After the printing has been performed, the ink ribbon 9 is separated from the print tape 8 by the three roller members 582 provided at the leading end 581 of the guide wall 58. The print tape 8 is maintained in a state of being in contact with the ink ribbon 9 while being conveyed from the nip portion N2 to the leading end 581 of the guide wall 58. As a result, between the nip portion N2 and the leading end 581, a peeling distance is secured for inhibiting the occurrence of peeling off of the ink due to the ink ribbon 9 being peeled from the print tape 8 before the ink transferred to the print tape 8 is fixed.

At the leading end 581, the print tape 8 conveyed along the conveyance path presses the ink ribbon 9 against the leading end 581. Here, the roller members 582 can rotate around the shaft body 583 extending in the up-down direction. As a result of the roller members 582 rotating in concert with the conveyance of the ink ribbon 9, a frictional force generated between the ink ribbon 9 and the roller members 582 is alleviated. Thus, the ink ribbon 9 is smoothly peeled from the print tape 8 at the leading end 581.

The peeled ink ribbon 9 passes to the left of the guide wall 58, curves at the rear end 586, and is conveyed along the winding path to the right. At the rear end 586, the central portion of the ink ribbon 9 in the width direction is pressed outward from an inner peripheral side of the curved section, by the bulge portion 587. Here, due to a difference between a conveyance speed of the print tape 8 and a winding speed of the ink ribbon 9, there is a possibility that the roller member 582 may rotate too much and may generate slack in the ink ribbon 9. The bulge portion 587 imparts tension to the ink ribbon 9, and suppresses the slack. Thus, the ink ribbon 9 is smoothly conveyed. The ink ribbon 9 is wound by the ribbon winding spool 22, via the winding path passing to the left of the guide wall 58 and to the rear of the head peripheral wall 36.

The printed print tape 8 passes through the nip portion N1 between the feed roller 56 and the conveyance roller 14, and is conveyed toward the discharge guide 49. The printed print tape 8 is discharged to the outside from the discharge guide 49, is cut by the cutting mechanism 16, and is discharged to the outside of the tape printer 1.

As described above, the ink ribbon 9 is conveyed along the conveyance path together with the print tape 8, is peeled from the print tape 8 by the guide wall 58, and is conveyed along the winding path. In order to secure the peeling distance necessary for characters and the like transferred from the ink ribbon 9 to be fixed, the print tape 8 reaches the guide wall 58 in a state of being closely adhered to the ink ribbon 9. The guide wall 58 includes the roller members 582 at the leading end 581. Due to the rotation of the roller members 582, the guide wall 58 can alleviate the frictional force generated between the ink ribbon 9 and the leading end 581 as a result of the print tape 8 pressing the ink ribbon 9 against the leading end 581. Thus, the tape cassette 30 can more reliably perform the peeling of the ink ribbon 9 while securing the peeling distance.

The leading end 581 of the guide wall 58 is configured by the roller member 582, and thus, the frictional force applied to the ink ribbon 9 is reduced. There is a possibility that the slack may be generated in the ink ribbon 9 due to the rotation of the roller members 582, but the bulge portion 587 imparts the tension to the ink ribbon 9 and suppresses the slack. Thus, the leading end 581 can more reliably peel the ink ribbon 9 from the print tape 8. Further, at the time of peeling, displacement of the ink ribbon 9 in the width direction may occur at the leading end 581 due to the imparting of the tension. The roller members 582 are wider than the bulge portion 587, and thus, even if the conveyance of the ink ribbon 9 is displaced in the width direction, the tape cassette 30 can reliably perform the peeling of the ink ribbon 9 from the print tape 8.

Various modifications are possible to the present disclosure from the above-described embodiment. Three of the roller members 582 are provided at the leading end 581 of the guide wall 58, but the number of the roller members 582 may be one or two, or may be four or more. The respective roller members 582 rotate independently around the shaft body 583, but the roller members 582 may be formed integrally with the shaft body 583 and may rotate all together. A configuration is adopted in which the bulge portion 587 bulges outward at the central portion of the rear end 586 but the bulge portion 587 may bulge at a plurality of locations in the up-down direction.

Figure 10:
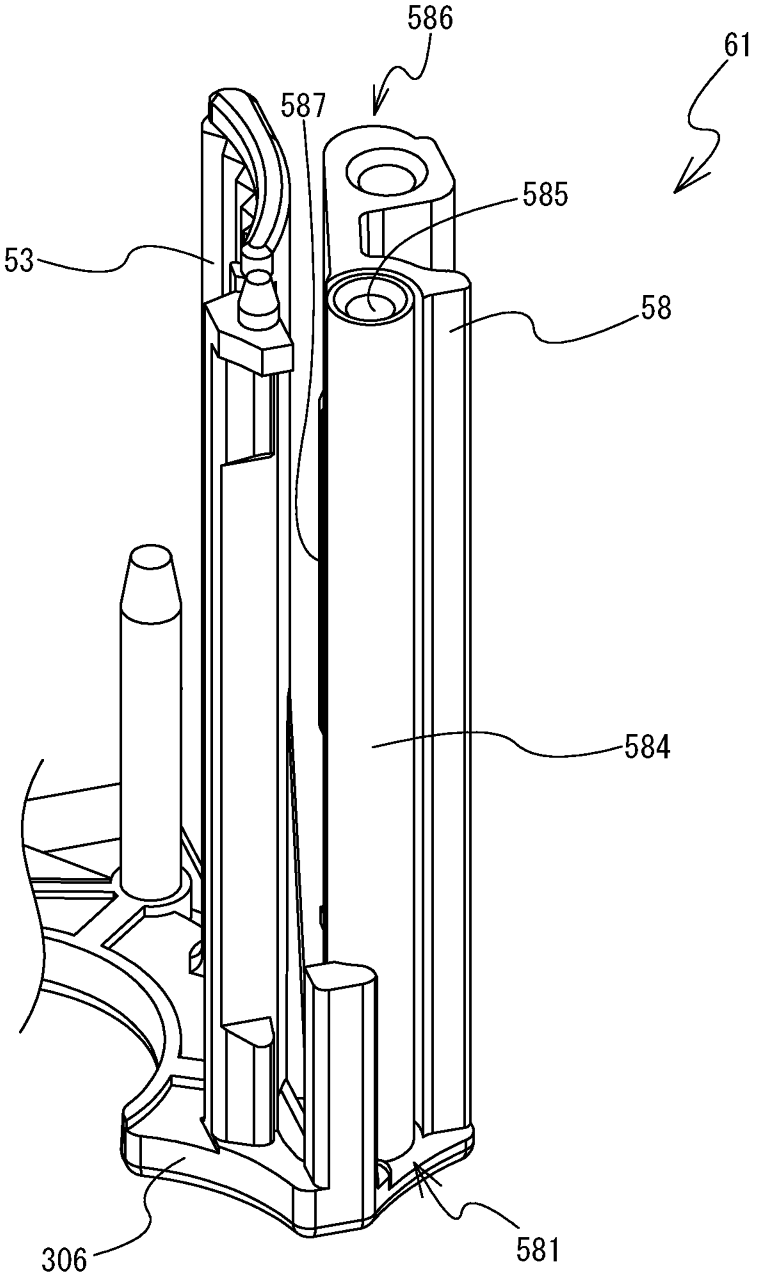
FIG. 10 is an enlarged perspective view of a modified example of the regulating guide.

For example, as shown in FIG. 10, the roller members 582 may be a single roller 584. The roller 584 extends in the up-down direction, and includes shaft holes 585 at the upper end and lower end thereof, respectively. By inserting shaft members (not shown in the drawings) that respectively protrude upward and downward from the bottom wall 306 of the lower case 312 and the upper wall 305 of the upper case 311 into the shaft holes 585, the roller 584 is rotatably supported at the leading end 581 of the guide wall 58. The length in the up-down direction of the roller 584 is greater than the length in the up-down direction of the bulge portion 587, and is greater than the width of the ink ribbon 9.

The ink ribbon 9 is peeled from the print tape 8 by the leading end 581 of the guide wall 58, and is conveyed along the winding path. At the time of peeling of the ink ribbon 9, tension is applied to the ink ribbon 9 by the winding of the ribbon winding spool 22, and thus, positional displacement in the width direction may occur at the leading end 581. The roller member 582 is the wide roller 584, and thus, even if the conveyance of the ink ribbon 9 becomes displaced in the width direction, the tape cassette 30 can reliably perform the peeling of the ink ribbon 9 from the print tape 8.

What is claimed is:

1. A tape cassette, comprising:

a cassette case including a bottom wall, and a side wall intersecting the bottom wall at a first side in a first direction, the cassette case having a recess recessed from a part of the side wall to a second side in the first direction, the second side in the first direction being opposite to the first side in the first direction, the part of the side wall including an opening, the recess passing through the cassette case in an up-down direction;

a tape roll housed inside the cassette case;

a print tape wound around the tape roll;

a ribbon roll housed inside the cassette case;

an ink ribbon wound around the ribbon roll;

a ribbon winding spool housed inside the cassette case;

an arm portion including a first wall and a second wall, the first wall being a part of the side wall, the second wall facing the first wall and extending upward from the bottom wall, the arm portion extending from a first side in a second direction to a second side in the second direction, the second direction being a direction intersecting the first direction and the up-down direction, the first side in the second direction being opposite to the second side in the second direction, the arm portion including a discharge port at an end, the end being positioned on the second side in the second direction with respect to the opening, the discharge port being configured to discharge the print tape and the ink ribbon conveyed between the first wall and the second wall, the recess being defined by the second wall and a peripheral wall at least; and a guide provided at a position downstream of the discharge port of the arm portion, on a conveyance path of the print tape and the ink ribbon, the guide including a first end at an end of the first side in the first direction, the guide being configured to guide the ink ribbon to a winding path by the first end coming into contact with the ink ribbon, the winding path being a path branching from the conveyance path and toward the ribbon winding spool, the first end of the guide being configured to rotate around a shaft extending in the up-down direction, the first end including a roller member in the up-down direction.

2. The tape cassette according to claim 1, wherein the roller member is a single roller having a length in the up-down direction greater than a width of the ink ribbon.

3. The tape cassette according to claim 1, wherein the guide includes a second end at an end of the second side in the first direction, the second end includes a bulge portion at a central portion in the up-down direction, the bulge portion bulges toward an outside of the second end, the bulge portion is positioned on the winding path of the ink ribbon, and a length of the roller member in the up-down direction is greater than a length in the up-down direction of the bulge portion.

* * * * *